T. Sharp,

Railroad Frog,

N°38,917. Patented June 16, 1863.

Witnesses:
W. E. Mans
B. W. Squires

Inventor:
Thomas Sharp,

UNITED STATES PATENT OFFICE.

THOMAS SHARP, OF CHICAGO, ILLINOIS.

IMPROVEMENT IN FROGS FOR RAILROAD-SWITCHES.

Specification forming part of Letters Patent No. 38,917, dated June 16, 1863.

*To all whom it may concern:*

Be it known that I, THOMAS SHARP, of Chicago, in the county of Cook and State of Illinois, have invented a new and useful Improvement in Frogs for Railroad-Switches; and I do hereby declare that the following is a full, clear, and exact description thereof, reference being had to the accompanying drawings, and the letters and figures marked thereon, which form part of this specification.

Figure 1:
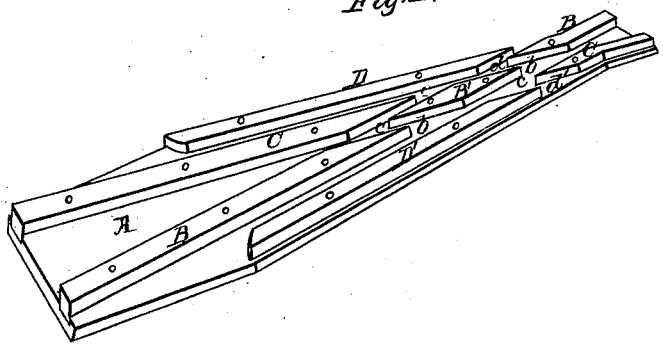
Figure 2:

In the said drawings, which are hereunto annexed, Figure 1 represents a perspective view of my invention, and Fig. 2 represents a block which may at times be used to render either track continuous.

The nature of my invention consists in providing or constructing the frog of a railroad-switch with an additional channel or groove for the purpose of adapting said frog to a car-wheel, which is provided with two flanges, which I have also invented.

My invention further consists in constructing the bed of said frog of cast-iron, and the bars or track upon which the wheels run of wrought-iron or malleable iron, said bars or track being sunk or embedded in grooves in said bed, and fastened thereto by bolts passing through said bars and bed, and fastened underneath said bed by nuts screwed upon the aforesaid bolts, thereby rendering the frogs much stronger and more durable, and also very greatly facilitating the repairing of those parts liable to wear out and get out of repair, as the track or bars upon which the wear comes can easily be taken up from the bed of the frog and replaced when repaired.

To enable those skilled in the art to understand the construction and use of my invention, I will proceed to describe the same with particularity.

The car-wheel for which my improved frog is designed is provided with two flanges, one of said flanges being on the outside of the wheel and the other on the inside thereof, differing in this respect from the ordinary car-wheel, which is provided with a flange upon the inner side only.

In the annexed drawings, A represents the cast-iron bed of the frog, and B B′ B one of the intesecting tracks, and C B′ C the other.

D D′ represent guards arranged to assist in guiding the wheels along the track, which also serve to strengthen the frog.

On each side of the track or bar B B′ B grooves or passages are cut through the other nitersecting track, C B′ C, taking therefrom the diamond-shaped blocks E and making the spaces $c\ c$. On each side of the track or bar C B′ C similar grooves or passages are cut through the intersecting track B B′ B, removing therefrom similar blocks and leaving similar spaces. Thus the diamond-shaped block B′ forms part of each track. The said tracks or bars are sunk into the bed A, as shown in the drawings, and are fastened to said bed by bolts, which pass through said tracks or bars and bed, and nuts which are screwed upon said bolts underneath, so that when any part of the tracks gets out of repair, they can readily be removed, repaired, and replaced, as aforesaid. When the cars pass over the track B B′ B, the flanges upon the wheels pass through the spaces $c\ c\ d$, and when the cars pass over the track C B′ C the sail flanges pass through the spaces $b\ b\ d'$. At stations where the side track is but little used, the main track may be made continuous by inserting two of the blocks E in the spaces adjacent B′—as, for instance, if B B′ B represent the main track, and the track C B′ C is seldom used, the spaces $b\ b$ may be filled by the insertion of the blocks E, thereby rendering the track B B′ B continuous, and whenever the track C B′ C is to be used, it can readily be arranged for use by simply removing the blocks from the spaces $d\ b$.

What I claim as my invention, and desire to secure by Letters Patent, is—

1. Providing the frog of a railroad-switch with an additional groove, substantially as and for the purposes herein specified and shown.

2. The combination of the wrought-iron or malleable iron track with the cast-iron bed or base, substantially in the manner and for the purposes herein delineated and set forth.

THOMAS SHARP.

Witnesses:
 W. E. MARRS,
 B. W. SQUIER.